June 22, 1965
L. A. JOHNSON
3,190,010
SPIRIT LEVEL
Filed Oct. 9, 1961
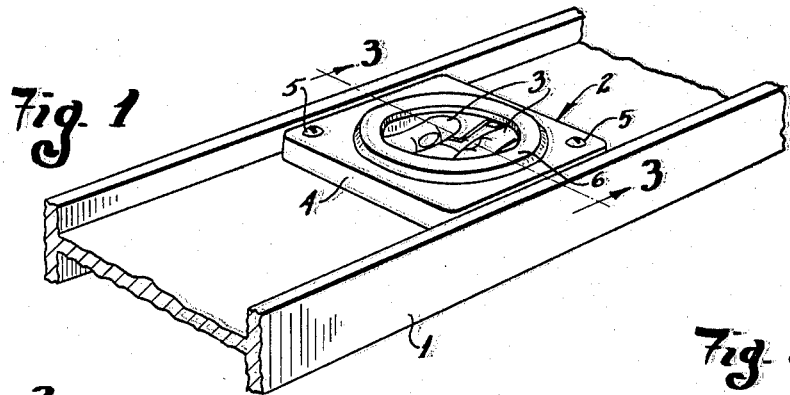
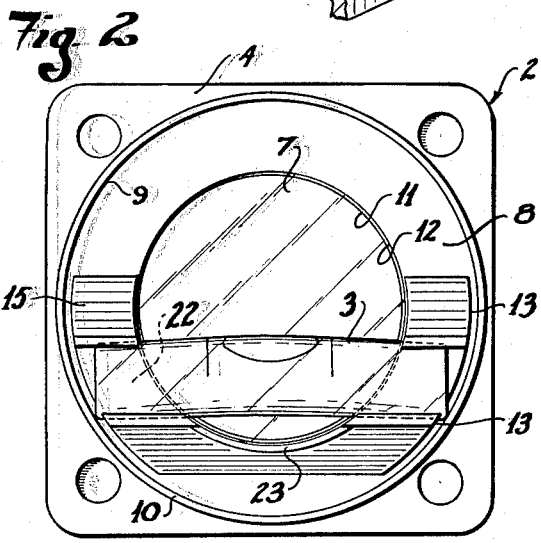
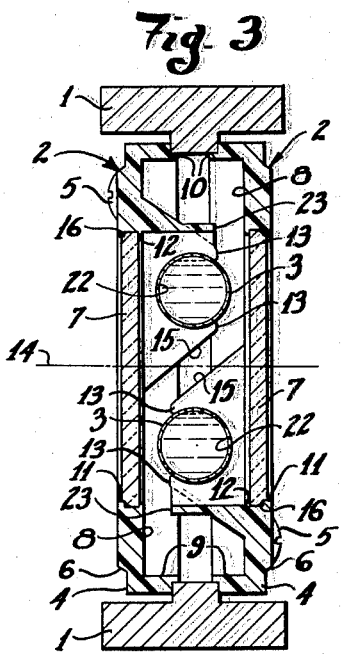
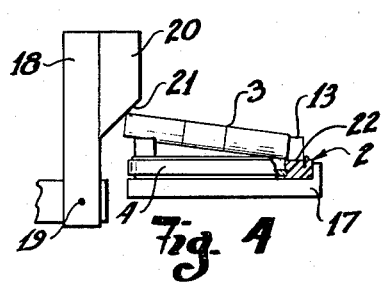
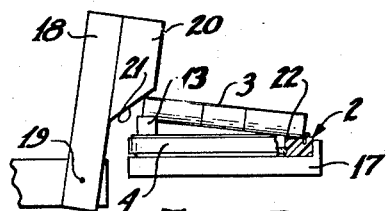
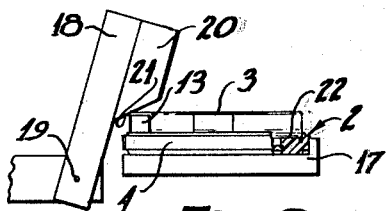
INVENTOR.
LAWRENCE A. JOHNSON
BY
Andrus & Starke
Attorneys United States Patent Office 3,190,010
Patented June 22, 1965

3,190,010
SPIRIT LEVEL
Lawrence A. Johnson, Milwaukee, Wis., assignor of one-half to George Johnson, Mequon, Wis.
Filed Oct. 9, 1961, Ser. No. 143,871
9 Claims. (Cl. 33—211)

This invention relates to a spirit level, and more particularly to a substantially improved construction wherein the level vial is easily inserted into its holder and is protected against extreme shock.

Heretofore, some levels have been manufactured having a frame and a plastic vial holder inserted in the frame. The particular constructions known in the prior art have, however, been subject to numerous disadvantages.

(1) In order to prevent a curved vial from shifting within its holder, adhesives were usually necessary to positively lock the vial in place.

(2) The glass vial was not sufficiently protected within its holder. As a result the vial and its holder would invariably shatter if the level was accidentally dropped, a common occurrence among workmen.

(3) When a separate vial-viewing window was used, sealing of the interior was difficult.

(4) Insertion of the window and vial into the holder was a delicate operation, usually involving several steps.

The present invention solves all of the above mentioned difficulties. In accordance with the invention, the vial holder is molded from a high impact flexible plastic and which includes snap-in members for each end of the vial. No adhesives are necessary, and the entire assembly is securely sealed. The construction provides a high degree of shock-proofing of the level assembly, a feature previously not possible to obtain. Insertion of the glass vial in the holder is accomplished by a single movement and utilizes an extremely simple yet effective mechanism.

The accompanying drawings illustrate the best mode contemplated by the inventor for carrying out the invention.

In the drawings:

FIGURE 1 is a perspective view of a portion of a level constructed in accordance with the invention;

FIG. 2 is an enlarged plan view of the inside of the vial holding case;

FIG. 3 is an enlarged section taken on line 3—3 of FIGURE 1;

FIG. 4 is a schematic side elevation of a vial inserting mechanism, showing the initial position of the vial;

FIG. 5 is a view similar to FIG. 4, showing one end of the vial held by a clamp; and FIG. 6 is a view similar to FIG. 4, with the vial in final position.

As shown in the drawings, the spirit level of the invention may be made with a frame 1 of lightweight tempered aluminum or other suitable material in the form of an I-beam. Frame 1 should be of sufficient gauge to provide proper strength for the level.

A circular opening is provided in frame 1 for receipt of a pair of molded plastic level vial case portions 2. Each case half is identical with its opposite half, and is turned 180° therefrom to provide a pair of closed tubular spirit vials 3 at each frame opening.

Vials 3 are made of glass or other suitable rigid material and are filled with fluid in a suitable manner to provide the usual air bubble. The vials are curved on a relatively large radius so that the correct amount of sensitivity of the bubble indicator is present.

The construction of each vial case 2 includes a rectangular peripheral edge portion 4 which receives a pair of diagonally opposite screws 5 therethrough for securement to frame 1. The exposed top surface of edge 4 is raised at 6 to provide a circular frame for the disc-like window 7 through which the vials 3 are observed.

On the under side of each case 2, edge portion 4 is intended by an annular recess having a base surface 8 and an annular side wall 9 which extends upwardly from the base and provides a flange 10 for centering the case within the opening of frame 1. Flange 10 extends above the under side of edge portion 4.

The inner surface of frame 6 includes an annular shoulder 11 which provides a window stop, and a ridge 12 spaced from and of less radial depth than shoulder 11 for window sealing purposes, as will be described hereinafter.

Each case 2 is adapted to securely hold and protect one level vial 3. For this purpose, a vial holding assembly is molded integral with the case and extends upwardly from base 8 to substantially above flange 10. The assembly comprises a pair of opposed vial clamps, each having a pair of opposed vial holding jaws or legs 13 extending inwardly away from the window and adapted to curvedly wrap around an end portion of a vial 3 and in tight surface contact therewith. The inner free end portions of legs 13 define a vial receiving opening therebetween. Each leg pair is adapted to extend more than 180° around the vial and with the free end portions thereof spaced a distance slightly less than the vial diameter. In the embodiment shown, the terminal leg ends are so spaced. The vial is thus held against all movement once it is inserted through the narrow opening.

As shown, the opposed clamps are on the same axis. However, it may be possible to mold the clamps so that they are on an angle corresponding to the vial curvature.

The vial clamps for each case portion are generally disposed on and rise from only one half of the periphery of surface 8 within the recess to permit space for the clamps and vial of the other case portion in the final assembly. However, the base of each inner leg 13 extends through an imaginary plane 14 bisecting the case, and each such inner leg extends diagonally at 15 away from plane 14 and toward its cooperating leg partner. The surfaces 15 of opposite case halves are adjacent and parallel in the final level assembly.

In accordance with the invention each case portion 2 is molded from a dimensionally stable plastic material having relatively high impact characteristics while being slightly flexible. It must stand weathering and must not cold flow under pressure, such as that of the securing screws 5. It must be shock and shatter proof and be non-elastic, yet bendable without breaking.

It has been found that a high impact acrylic thermoplastic molding material is very suitable for the case of the invention. One such material is sold under the trademark Implex which has a flexural strength of about 8700 p.s.i. and an impact strength of about 30 ft.-lbs.

In contrast, each vial window 7 is molded or cut from a relatively low impact material, such as an acrylic plastic having a flexural strength of about 15,000 p.s.i. (about twice that of case 2) and an impact strength of about 3 ft.-lbs. (about one-tenth that of case 2).

Use of the flexible high impact material for the case makes possible a simple snap-in window sealing structure wherein no sealant is necessary. The low impact window 7 is inserted in the case opening by snapping it past ridge 12 and up against shoulder 11. The forward edge 16 of window 7 is rounded smooth to assist in passing over the ridge. Ridge 12, which extends radially inwardly from the edge of window 7, provides a tight seal.

Furthermore, the flexible high impact case permits for the first time a wrap-around vial holding structure. The legs 13 require a negative draft in molding the case, and will simply snap out of the mold after the material has cooled. The glass vial can be easily inserted through the openings in the clamps by snapping it in, since legs 13 can safely spread. Slight variations in vial dimensions can be accommodated, in view of leg flexibility and the angle of surfaces 15. These characteristics also permit expansion and contraction of the vial and case due to temperature changes, without building up dangerous stresses therebetween.

Since screws 5 are smaller than their respective openings, adjustment of one case relative to the other is permitted by spacing surfaces 15.

For purposes of easier vial snapin action, the entire clamp assembly is spaced from side wall 9 so that the case itself does not resist flexing of legs 13. At the same time, raised frame 6, which is on the other side of the case from legs 13, thickens the case to resist bending thereof about the vial axis.

After insertion of window 7, the vial 3 may be snapped into its clamps by hand. FIGS. 4, 5 and 6 show a mechanism which easily and quickly accomplishes the desired result. A horizontal support 17 is provided to receive and hold the case half face down, and with the vial clamps fully exposed. A vertical lever 18 is disposed closely adjacent one pair of legs 13 and is mounted for pivoting about axis 19 below support 17.

A vial pusher 20 is secured to the face of lever 18 adjacent legs 13 and has an inclined cam 21 extending downwardly at about 45° from the horizontal.

A glass vial 3 is placed on case 2 in the manner shown in FIG. 4. Since each pair of legs 13 is curved slightly to follow the annular configuration of surface 8, the inner end of vial 3 rests on a ledge 22 formed by the circular opening between the leg pairs. The outer end of vial 3 rests on the top edges of the other pair of legs. These edges are disposed closer to each other than the vial diameter.

Lever 18 is now pivoted so that cam 21 engages and pushes on the outer end of the vial (FIG. 5). The major force at the beginning of cam action is horizontal, which pushes the vial so that its inner end enters the opening between the adjacent leg pairs. The legs spread apart to permit this movement, which continues until the inner vial end engages side wall 9. At this point, the cam action becomes more directly downward, and snaps the outer vial end into its clamp from above (FIG. 6). Both ends of vial 3 engage and are held securely by opposite sides of wall 9, which serves as a centering locator.

After a vial is inserted into both case halves, the latter are secured to frame 1, as shown in FIG. 3. The construction permits vials 3 to be spaced from window 7 so that the former are entirely shock proofed and cushioned by the flexible case, which utilizes the wrap-around gripping clamps. Each case half is entirely separated from the other half. Diagonal surfaces 15, which complement each other and are spaced apart, permit variations in vial size. If desired an arcuate connector member 23 may join opposed leg portions so that the vial-viewing opening in the assembled level visually appears to have a substantially continuous wall.

The completed level assembly has been found to have characteristics previously unknown in the art. The combination of a high impact non-shatterable case which holds a low impact shatterable rigid window and vial produces a structure which will not break under severe conditions.

Tests with a level constructed in accordance with the invention have proven that there is no window or vial breakage or shattering when the level is dropped ten feet onto cement or thrown thirty feet against a hard surface. To the knowledge of the inventor, no other level constructions can withstand such shocks.

Various modes of carrying out the invention are contemplated as within the scope of the following claims particularly pointing out and distinctly claiming the subject matter which is regarded as the invention.

I claim:
1. For use in a spirit level having a frame with an opening therein, the combination comprising:
   a slightly flexible shatter-proof case of high impact plastic adapted to be secured to said frame at said opening,
   a rigid shatterable disc-like window of lower impact material than said case and secured therewithin,
   a tubular shatterable spirit vial,
   and a pair of flexible vial clamps integral with said case and extending inwardly away from said window,
   each clamp comprising a pair of opposed legs which circumferentially wrap around the vial in tight surface contact therewith and with each leg terminating so that the inner leg ends are spaced a distance slightly less than the vial diameter whereby each clamp wraps around more than 180° of an end portion of the said vial and the slight flexibility of the legs permits snapping of the vial ends into said clamps during assembly.

2. For use in a spirit level having a frame with an opening therein, the combination comprising:
   a slightly flexible shatter-proof case of high impact plastic adapted to be secured to said frame at said opening,
   a rigid shatterable disc-like window of lower impact material than said case and secured therewithin,
   a tubular shatterable spirit vial,
   and a pair of flexible vial clamps integral with said case and extending inwardly away from said window,
   each clamp comprising a pair of opposed legs which circumferentially wrap around the vial in tight surface contact therewith and with each leg terminating so that the inner leg ends are spaced a distance slightly less than the vial diameter whereby each clamp wraps around more than 180° of an end portion of the said vial and the slight flexibility of the legs permits snapping of the vial ends into said clamps during assembly,
   said case having a flexural strength of about one-half that of the said window in p.s.i.,
   and the case having an impact strength of about ten times that of the window in ft.-lbs.

3. For use in a spirit level having a frame with an opening therein and having a tubular shatterable spirit vial:
   a slightly flexible vial case of high impact plastic adapted to be secured to the frame at the frame opening, said case comprising:
      a peripheral edge portion,
   an annular recess in said edge portion and defined by an annular base surface and an annular side wall,
   first and second vial clamps integral with said case and rising from said base surface within said recess,
   said vial clamps being spaced from said side wall and from each other and with each clamp including a pair of spaced slightly flexible legs,
   each leg pair being adapted to circumferentially wrap around one end of the vial in tight surface contact therewith and with each leg terminating with the inner ends of the legs spaced a distance slightly less than the vial diameter so that the vial ends may be snapped into said clamps during assembly.

4. For use in a spirit level having a frame:
   a slightly flexible non-shatterable vial case of high impact plastic adapted to be secured to the frame, said case having a peripheral edge portion defining a circular opening,
   an annular shoulder in said opening,
   an annular ridge in the wall of said opening and spaced from said shoulder,
   a rigid shatterable disc-like window of lower impact material than said case and mounted within the latter between said shoulder and said ridge,
   an annular recess in said peripheral edge portion and defined by an annular base surface and an annular side wall, first and second clamps integral with said case and extending inwardly from said base surface, said clamps being spaced from said side wall and from each other and with each clamp including a pair of spaced flexible legs, and a tubular shatterable spirit vial held about each end by one pair of legs, each pair of legs wrapping around the vial circumferentially in surface contact therewith and with each leg terminating so that the inner ends of the legs are spaced a distance less than the vial diameter and the vial ends may be snapped into said clamps.

5. The level of claim 4 in which:

an identical case is adapted to be secured to each side of the frame opening and is adapted to be turned 180° from the opposite case, and one leg of each clamp extends diagonally from the said base surface and complements a similar leg of the opposite case.

6. The level of claim 5 in which:

the complementing legs of opposite cases are spaced to permit adjustment of one case relative to the other.

7. For use in a level having a tubular spirit vial:

a slightly flexible shatter-proof case of high impact plastic, and a pair of slightly flexible vial clamps integral with said case, each clamp comprising a pair of opposed spaced legs disposed and adapted to circumferentially wrap around a vial in tight surface contact therewith, the inner terminating ends of each leg pair being spaced a distance slightly less than a vial diameter so that the vial may be snapped into the clamps.

8. For use in a level having a tubular spirit vial:

a pair of spaced case portions having opposed windows, and a pair of slightly flexible vial clamps disposed within at least one of said case portions, each clamp having a pair of opposed spaced legs disposed and adapted to circumferentially wrap around a vial in tight surface contact therewith, each leg terminating so that the ends of each leg pair and a vial contained therebetween are disposed inwardly from the adjacent window, and said legs are spaced apart a distance slightly less than a vial diameter so that the vial may be snapped into the clamps.

9. For use in a level having a tubular spirit vial:

a slightly flexible shatterproof case of high impact plastic, and a pair of flexible vial clamps disposed within said case, each clamp comprising a pair of opposed spaced vial holding legs disposed and adapted to circumferentially wrap around a vial in tight surface contact therewith and defining a vial receiving opening between the free end portions thereof, the said free end portions of each leg pair being spaced apart a distance slightly less than a vial diameter so that the slight flexibility of the legs permit snapping of a vial into the clamps through said openings.

References Cited by the Examiner
UNITED STATES PATENTS

| | | | |
|---|---|---|---|
| 1,497,909 | 6/24 | Holtforth | 29—200 |
| 1,928,653 | 10/33 | McEvoy | 29—200 |
| 2,453,091 | 11/48 | Holloway | 33—211 |
| 2,720,709 | 10/55 | Stankawitz | 33—211 |
| 2,744,649 | 5/56 | Smith | 248—316 X |
| 2,792,638 | 5/57 | Pugel | 33—211 |
| 2,810,206 | 10/57 | Ziemann | 33—211 |
| 2,872,843 | 2/59 | Kono | 88—47 X |
| 2,948,066 | 8/60 | Rosenholm | 33—211 |

ISAAC LISANN, *Primary Examiner.*